(12) United States Patent
Zhao et al.

(10) Patent No.: US 9,563,284 B2
(45) Date of Patent: Feb. 7, 2017

(54) INFORMATION PROCESSING DEVICE AND CONTROL METHOD THEREOF

(75) Inventors: Chunlei Zhao, Beijing (CN); Wei Wei, Beijing (CN)

(73) Assignees: BEIJING LENOVO SOFTWARE LTD., Haidian District, Beijing (CN); LENOVO (BEIJING) CO., LTD., Haidian District, Beijing (CN)

(*) Notice: Subject to any disclaimer, the term of this patent is extended or adjusted under 35 U.S.C. 154(b) by 198 days.

(21) Appl. No.: 13/818,733

(22) PCT Filed: Aug. 18, 2011

(86) PCT No.: PCT/CN2011/078571
§ 371 (c)(1),
(2), (4) Date: Feb. 25, 2013

(87) PCT Pub. No.: WO2012/025029
PCT Pub. Date: Mar. 1, 2012

(65) Prior Publication Data
US 2013/0147712 A1    Jun. 13, 2013

(30) Foreign Application Priority Data
Aug. 24, 2010 (CN) .......................... 2010 1 0262091

(51) Int. Cl.
G06F 3/0346 (2013.01)
G06F 1/16 (2006.01)
(Continued)

(52) U.S. Cl.
CPC ........... *G06F 3/0346* (2013.01); *G06F 1/1694* (2013.01); *G06F 1/3203* (2013.01); *G06F 1/3231* (2013.01);
(Continued)

(58) Field of Classification Search
CPC ...... G06F 3/0346; G06F 3/033; G06F 3/0304; G06F 3/017; G06F 3/03547; G06F 3/013; G06F 3/0383
(Continued)

(56) References Cited

U.S. PATENT DOCUMENTS 8,260,364 B2      9/2012   Kim
8,300,020 B2 *   10/2012   Moussavi ..................... 345/173
(Continued)

FOREIGN PATENT DOCUMENTS

CN     1961488       5/2007
CN     101276530     10/2008
(Continued)

OTHER PUBLICATIONS

PCT/CN2011/078751 International Search Report dated Nov. 24, 2011 (3 pages).
(Continued)

*Primary Examiner* — Olga Merkoulova
(74) *Attorney, Agent, or Firm* — Brinks Gilson & Lione; G. Peter Nichols

(57) ABSTRACT

An information processing device and a control method applied to the information processing device is described. The information processing device includes a display unit configured to display images; an input unit configured to receive inputs from a user; a motion detecting unit configured to detect motion of the information processing device and to generate data related to the motion; and a processing unit connected to the display unit, the input unit and the motion detecting unit. The processing unit is configured to receive the motion-related data from the motion detecting unit, and enable/disable of the display unit and/or the input unit based on the data related to the motion.

16 Claims, 2 Drawing Sheets

(51) Int. Cl.
*G06F 1/32* (2006.01)
*H04W 52/02* (2009.01)
*H04M 1/67* (2006.01)

(52) U.S. Cl.
CPC ........... *G06F 1/3259* (2013.01); *G06F 1/3265* (2013.01); *H04W 52/0254* (2013.01); *H04M 1/67* (2013.01); *H04M 2250/12* (2013.01); *H04M 2250/22* (2013.01); *Y02B 60/1242* (2013.01); *Y02B 60/1253* (2013.01); *Y02B 60/1289* (2013.01)

(58) Field of Classification Search
USPC .... 345/156–184; 178/18.01–19.07; 708/131, 708/142–146; 341/22–34; 340/7.1, 407.1–407.2
See application file for complete search history.

(56) References Cited

U.S. PATENT DOCUMENTS

| | | | | |
|---|---|---|---|---|
| 8,351,773 | B2* | 1/2013 | Nasiri | A63F 13/06 396/55 |
| 8,417,268 | B1* | 4/2013 | Halferty | H04W 4/027 455/410 |
| 2003/0045274 | A1* | 3/2003 | Nishitani | 455/414 |
| 2005/0221791 | A1* | 10/2005 | Angelhag | H04B 1/1615 455/343.5 |
| 2006/0030289 | A1* | 2/2006 | Liguori | B43K 29/007 455/344 |
| 2007/0010943 | A1* | 1/2007 | Pair et al. | 701/213 |
| 2008/0238857 | A1* | 10/2008 | Zhang | G09G 3/3406 345/102 |
| 2009/0153500 | A1* | 6/2009 | Cho | 345/173 |
| 2010/0039394 | A1* | 2/2010 | Moussavi | 345/173 |
| 2010/0099464 | A1* | 4/2010 | Kim | G06F 1/1615 455/566 |
| 2010/0234047 | A1* | 9/2010 | Lipovski | H04M 19/044 455/456.4 |
| 2010/0235667 | A1* | 9/2010 | Mucignat | G06F 1/3203 713/323 |
| 2011/0163955 | A1* | 7/2011 | Nasiri | A63F 13/06 345/158 |
| 2014/0141833 | A1* | 5/2014 | Fan | H04M 1/72597 455/550.1 |

FOREIGN PATENT DOCUMENTS

| | | |
|---|---|---|
| CN | 101729660 | 6/2010 |
| CN | 201523407 | 7/2010 |
| CN | 201523407 U | 7/2010 |

OTHER PUBLICATIONS

PCT/CN2011/078571 International Preliminary Report on Patentability dated Feb. 26, 2013 (9 pages).
First Office Action dated Mar. 4, 2013 in corresponding Chinese priority application 201010262091.8 (19 pages including English translation).

\* cited by examiner

INFORMATION PROCESSING DEVICE AND CONTROL METHOD THEREOF

BACKGROUND OF THE INVENTION

This application claims priority to International Application No. PCT/PCT/CN2011/078571 filed Aug. 18, 2011; and to Chinese Patent Appln. CN201010262091.8 filed on Aug. 24, 2010, the entire contents of each are incorporated herein by reference.

The present invention relates to an information processing device and a control method thereof.

With continuous development of mobile communication technology, mobile communication terminals such as cell phones are more and more popular. When using a mobile communication terminal to make a call or answer a voicemail, a user usually puts the mobile communication terminal near his ear. In this case, the user's ear is likely to inadvertently contact keys or touch-sensors provided on the mobile communication terminal. Therefore, it may result in misoperations of the mobile communication terminal, such as light of the screen, or hanging-up of the phone, etc., which generally increases power consumption and makes users feel inconvenient.

SUMMARY OF THE INVENTION

In order to solve, the above problems, according to one aspect of the present invention, there is provided an information processing device, comprising: a display unit configured to display images; an input unit configured to receive inputs from a user; a motion detecting unit, configured to detect motion of the information processing device, and to generate motion-related data; and a processing unit, which is connected with the display unit, the input unit and the motion detecting unit, and is configured to receive the motion-related data from the motion detecting unit, and based on the motion-related data, to control enable/disable of the display unit and/or the input unit.

In addition, according to another aspect of the present invention, there is provided a control method applied in an information processing device, wherein the information processing device comprises a display unit and an input unit, the control method comprising: detecting motion of the information processing device, and generating motion-related data; and based on the motion-related data, controlling enable/disable of the display unit and/or the input unit.

According to the above configurations, during a call such as making a call or answering a call or the like, by detecting motion-related data to control enable/disable of the display unit and/or the input unit, it effectively prevents inadvertent lighting of the display unit (e.g., a display screen) or misoperations due to the contact of the user's face or ear with the input unit, thereby improving user experience and reducing power consumption of the information processing device.

DETAILED DESCRIPTION OF THE PREFERRED EMBODIMENTS

Figure 1:
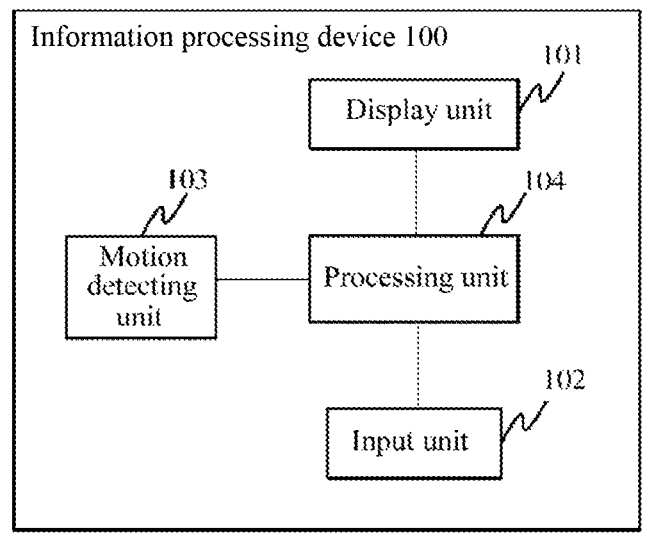
FIG. 1 is a schematic block diagram illustrating a structure of the information processing device according to an embodiment of the present invention.

Hereinafter, various embodiments according to the present invention will be described in detail with reference to the drawings. Here, it should be noted that, throughout the drawings, parts which have substantially same or similar structures and functions are given the same reference numerals, and of which repeated description will be omitted.

Below, with reference to FIG. 1, an exemplary embodiment of the present invention will be described briefly. FIG. 1 is a schematic block diagram illustrating a structure of an information processing device 100 according to an embodiment of the present invention.

As shown in FIG. 1, the information processing device 100, such as a mobile phone or the like, comprises a display unit 101, an input unit 102, a motion detecting unit 103, and a processing unit 104. The display unit 101, the input unit 102, and the motion detecting unit 103 are respectively connected with the processing unit 104.

According to the exemplary embodiment of the present invention, for example, the display unit 101 comprises at least one type from a liquid crystal display panel and no OLED display panel, and it is used to display images based on image signals from the processing unit 104 or a graphic-processing unit (not shown).

Depending on specific configurations, the input unit 102 comprises any hard keys, joystick, and touch-sensing units such as a capacitive or a resistive touch-sensor or the like, and can generate input signals corresponding to a user's inputs. In the case that the input unit 102 is a touch-sensing unit, the arrangement area of the input unit 102 may be overlapped with, or partially overlapped with the display unit 101, or in the periphery of the display unit 101.

Depending on specific configurations, the motion detecting unit 103 comprises at least one type from any 3-axis acceleration sensor and any gyroscope, and it can detect motion of the information processing device 100 and generate the motion-related data of the information processing device 100.

In addition, the processing unit 104 comprises a processor, a microprocessor, or a DSP etc., which can be applied in the information processing device 100 and executes a predetermined processing based on a predetermined program. According to the embodiment of the present invention, the processing unit 104 may be configured to receive the motion-related data from the motion detecting unit 103, and based on the data, to control enable/disable of the display unit 101 and/or the input unit 102.

Typically, in the prior art, when a user uses an information processing device to start making a call, since the user does not need to watch the display unit during the call, the information processing device normally shuts down the display unit for saving power. In this case, because of a frequent contact of the user's face or ear with the input unit and/or the display unit during the call, it usually results in lighting of a screen or misoperations of the input unit. However, according to the present invention, by detecting the motion-related data to control enable/disable of the display unit and/or the input unit, it can effectively prevent lighting of the screen or misoperations due to the contact of the information processing device 100 with the user's face or ear.

Below, according to one embodiment of the present invention, a specific operation of the processing unit 104 for controlling enable/disable of the display unit 101 and/or the input unit 102 will be described in detail. In this embodiment, the motion detecting unit 103 is a 3-axis acceleration sensor, and can detect acceleration values of the information processing device 100 on three axes (e.g., x, y and z-axis).

Below, a description is given with the case that a user makes a call as an example. When a user starts to make a call (which comprises a call connection-establishment process and a calling process after the call connection-establishment, etc.), the information processing device 100 may keep the display unit 101 in a disabled state in order to save power, or keep the input unit 102 in a disabled state in order to prevent misoperations. For example, by way of maintaining the power interruption of the backlight of the display unit 101, the display unit 101 can be kept disabled. In addition, for example, the processing unit 104 may shut down the input unit 102 or have no action to the signals generated by the input unit 102, so as to keep the input unit 102 disabled.

In this case, according to the embodiment of the present invention, the motion detecting unit 103 detects the acceleration values of the information processing device 100. Specifically, the motion detecting unit 103 detects the acceleration values of the information processing device 100 on three mutually-perpendicular axes (i.e., x, y, and z-axis). For example, the x- and y-axis respectively indicate a transverse direction and a longitudinal direction of the information processing device 100, while the z-axis indicates a direction perpendicular to the display unit 101 (e.g., an LCD screen) of the information processing device 100. After the motion detecting unit 103 detects the acceleration values of the information processing device 100 in directions of the three axes, the motion detecting unit 103 sends the detected data (i.e., the acceleration values) to the processing unit 104.

After the processing unit 104 receives the 3-axis acceleration values from the motion detecting unit 103, the processing unit 104 makes a judgment based on the acceleration values, in which when the acceleration values of the information processing device 100 satisfy a predetermined condition, the processing unit 104 enables the display unit 101 and/or the input unit 102; otherwise, the processing unit 104 keeps the display unit 101 and/or the input unit 102 in a disabled state. For example, in the case that the processing unit 104 enables the display unit 101 and/or the input unit 102, the processing unit 104 may enable the display unit 101 to allow a user to view the contents of the display unit 101, meanwhile the user can unlock the information processing device 100 according to the tips displayed on the display unit 101. In addition, the processing unit 104 may also enable the input unit 102 to allow a user to directly use a specific key of the input unit 102, or—in the case that the input unit 102 comprises a touch-sensor—to directly contact a specific pattern or a specific position of the input unit 102 to unlock the information processing device 100. In addition, it is obvious that the processing unit 104 may also enable the display unit 101 and the input unit 102 simultaneously.

In this case, even if a user makes an outgoing call, and during the call the user's face or ear contacts with the input unit 102 or the display unit 101 (in the case that the input unit 102 comprises a touch-sensor), since the processing unit 104 keeps the display unit 101 and/or the input unit 102 in a disabled state, lighting of the screen or misoperations will not occur due to the contact of the users face or ear. This not only increases the degree of user experience of using the information processing device 100, but also further reduces power consumption of the information processing device 100.

Below, the processing of the processing unit for enabling/disabling the display unit 101 and/or the input unit 102 based on the acceleration values will be described in detail.

According to one embodiment of the present invention, the processing unit 104, based on the acceleration values (x, y, z-axis) of the information processing device 100, determines a motion-magnitude, and compares the motion-magnitude with a predetermined threshold. Herein, the motion-magnitude indicates an amplitude of the motion of the information processing device 100. Herein, the predetermined threshold may be stored in a storage unit (not shown) of the information processing device 100. The storage unit can be a ROM of the information processing device 100 or a memory card inserted into the information processing device 100.

Specifically, the processing unit 104 obtains the acceleration values (x, y, z-axis) of the information processing device 100, and based on the 3-axis acceleration values, determines a motion-magnitude with the following Expression (1):

$$\Delta = \frac{\alpha * |(x2-x1)| + \beta * |(y2-y1)| + \varepsilon * |(z2-z1)|}{t2-t1} \qquad \text{Expression (1)}$$

Where, $\Delta$ indicates the motion-magnitude, t1 indicates a certain time point during the motion, t2 indicates a certain time point after t1 during the motion, x2 indicates the acceleration value in the x-axis direction at the moment t2, and x1 indicates the acceleration value in the x-axis direction at the moment t1. Similarly, y2 indicates the acceleration values in the y-axis direction at the moment t2, and y1 indicates the acceleration value in the y-axis direction at the moment t1. Z2 indicates the acceleration value in the z-axis direction at the moment t2, and z1 indicates the acceleration value in the z-axis direction at the moment t1. In addition, $\alpha$, $\beta$, $\gamma$, respectively indicates predetermined weighting factors, and they can be determined based on empirical values. The motion-magnitude $\Delta$ calculated with the expression (1) indicates a mean value of the varying amplitudes of the acceleration values within a certain period of time during the motion.

In addition, the ways for determining the motion-magnitudes are not limited to this. For example, it is also possible to determine the motion-magnitude based on the following expression (2):

$$\Delta = \alpha * |(x2-x1)| + \beta * |(y2-y1)| + \varepsilon * |(z2-z1)| \qquad \text{Expression (2)}$$

Where, the motion-magnitude $\Delta$ calculated with the expression (2) indicates the accumulated value of the varying amplitudes of the acceleration values within a certain period of time during the motion.

Similarly, it is also possible take the value obtained by a weighted-sum of the 3-axis (x, y, z-axis) acceleration values as the motion-magnitude $\Delta$. Since there are still a variety of ways to obtain a motion-magnitude which indicates an amplitude of a motion, the processing unit 104 can also use any other available calculation method to obtain the motion-magnitude.

After the processing unit 104 obtains the motion-magnitude $\Delta$, the processing unit 104 compares the motion-magnitudes $\Delta$ with a predetermined motion-magnitude threshold. For example, because the information processing device 100 generally has a relatively small motion-magnitude during a call or the like made by a user, but it has a relatively large motion-magnitude at the end of a call when the user takes the information processing device 100 away from his ear; thus, depending on requirements, a relatively large motion-magnitude, which indicates a relatively large amplitude of a motion, can be set freely as a motion-magnitude threshold, and the threshold may be set based on experience.

If the processing unit 104 determines that the motion-magnitude Δ is greater than the motion-magnitude threshold, then the processing unit 104 enables the display unit 101 and/or the input unit 102. Moreover, if the processing unit 104 determines that the motion-magnitude Δ is less than or equal to the motion-magnitude threshold, then the processing unit 104 keeps the display unit 101 and/or the input unit 102 disabled. That is, when the acceleration values of the information processing device 100 satisfy a predetermined condition, the processing unit 104 changes the current state(s) of the display unit 101 and/or the input unit 102, but when the acceleration values of the information processing device 100 do not satisfy the predetermined condition, the processing unit 104 keeps the current state(s) of the display unit 101 and/or the input unit 102.

With the above configuration, in the case that a user uses the information processing device to make a call or answer a voicemail or the like, only when the motion-magnitude is greater than the motion-magnitude threshold (it is usually the case that the user takes the information processing device 100 away), will the processing unit 104 allow to enable the display unit 101 and/or the input unit 102, thereby preventing inadvertent lighting of the display unit 101 and misoperations due to the contact of the user with the input unit 102 of the information processing device 100.

Below, according to another embodiment of the present invention, the processing of the processing unit for enabling/disabling the display unit 101 and/or the input unit 102 based on the acceleration values will be described in detail.

Unlike the aforementioned method which adopts the acceleration values to determine the motion-magnitude, the processing unit 104 determines the posture of the information processing device 100 at the end of the motion based on the acceleration values (x, y, z-axis) and only when the posture of the information processing device 100 satisfies a predetermined condition, will the processing unit 104 enables the display unit 101 and/or the input unit 102. Otherwise, the processing unit 104 keeps the display unit 101 and/or the input unit 102 disabled.

Specifically, the processing unit 104 receives the 3-axis acceleration values (x, y, z-axis) from the motion detecting unit 103, and monitors changes in the 3-axis acceleration values. At the end of an action that the user takes the information processing device 100 away from his ear, the 3-axis acceleration values of the information processing device 100 almost have no changes, therefore, at this point, the processing unit 104 calculates the posture of the information processing device 100 with the acceleration values of the information processing device 100. For example, the processing unit 104 may use trigonometric functions to determine the posture of the information processing device 100 based on the ratios of the 3-axis (x, y, z-axis) acceleration values. As it is well known to the skilled in the art to determine the posture of the device based on the acceleration values, a detailed description thereof is omitted.

For example, in the case such as making a call or listening to a voicemail or the like, a user needs to put the information processing device 100 near his ear. In this case, the display unit 101 of the information processing device 100 is usually orthogonal to the ground (a horizontal plane), that is, the center axis of the display unit 100 is generally parallel with the ground. In the case that the user ends a call or ends listening to voicemail or the like, because the action that the user takes the information processing device 100 away from his ear usually results in that: the display unit 101 of the information processing device 100 is parallel with the ground or its posture is very different from the posture when the user puts the information processing device 100 near his ear. Therefore, by judging whether or not the posture of the display unit 101 of the information processing device 100 tends to horizontal, or through calculation of the posture-change (angular difference) of the display unit 101 before and after the action, it can determine whether or not the user takes the information processing device 100 away from his ear. Here, it should be noted that, whether or not the action ends may be determined through the changes or not in the acceleration values. For example, the acceleration values before the action, during the action and after the action, respectively are constant, changed and unchanged; therefore, obviously, the processing unit 104 according to the embodiment of the present invention can easily determine the start and end of the action. After the action is ended, in the case that the posture of the display unit 101 tends to horizontal, or the posture-change (angular difference) of the display unit 101 before and after the action is greater than a predetermined value (set based on experience), the processing unit 104 enables the display unit 101 and/or the input unit 102. Otherwise, the processing unit 104 keeps the display unit 101 and/or the input unit 102 disabled.

As described above, with the use of the acceleration values, not only the motion-magnitude can be detected, but also the display unit 101 and/or the input unit 102 may be enabled/disabled, based on the posture-change of the information processing device 100 before and after the motion.

Next, the operation performed by the information processing device 100 will be described, with the case that the motion detecting unit 103 is a gyroscope.

In the case that the motion detecting unit 103 is a gyroscope, when a user starts to make a call or answer a call, the motion detecting unit 103 can detect both an angular velocity and an angular acceleration which indicate the rotation of the information processing device 100 (i.e., the posture-change of the information processing device 100), and send the above information of the angular velocity and the angular acceleration to the processing unit 104. When the angular velocity and the angular acceleration, indicating the rotation extent of the information processing device 100 exceed predetermined thresholds, it usually indicates a relatively large motion-magnitude of the information processing device 100, and that motion is usually an action that the user takes the information processing device 100 away from his ear. Therefore, similar to the afore-description of the case that the motion detecting unit 103 is an acceleration sensor the processing unit 104 compares both the angular velocity and the angular acceleration detected by the motion detecting unit 103 with predetermined angular velocity and angular acceleration thresholds, and when the angular velocity and the angular acceleration are greater than the predetermined angular velocity and angular acceleration thresholds, the processing unit 104 enables the display unit 101 and/or the input unit 102. Otherwise, the processing unit 104 keeps the display unit 101 and/or the input unit 102 disabled.

Figure 2:
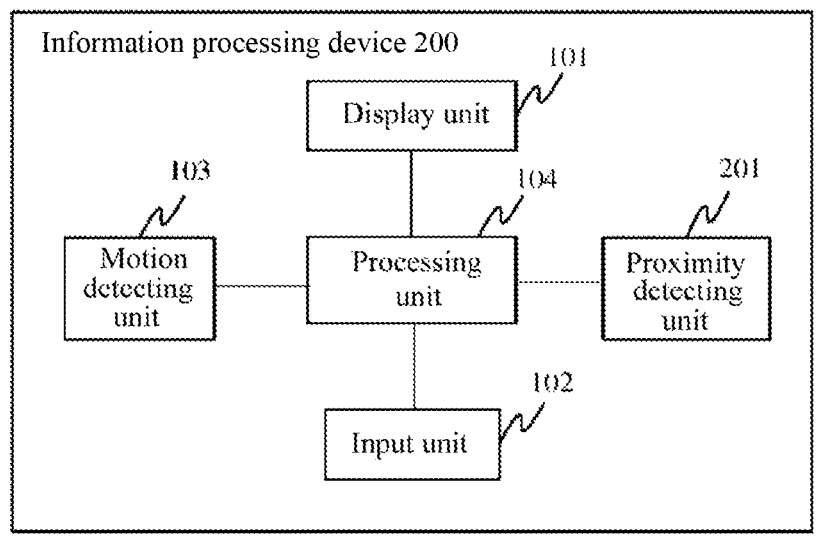
FIG. 2 is a schematic block diagram illustrating a structure of the information processing device according to another embodiment of the present invention.

Below, an information processing device according to another embodiment of the present invention will be described in detail. FIG. 2 is a schematic diagram illustrating a structure of an information processing device 200 according to another embodiment of the present invention.

As shown in FIG. 2, the information processing device 200 of FIG. 2 differs from the information processing device 100 of FIG. 1 in that: the information processing device 200 of FIG. 2 further comprises a proximity detecting unit 201. According to the embodiment of the present invention, the proximity detecting unit 201 may be provided around the display unit 101. For example, the proximity detecting unit 201 may be provided in the vicinity of an earphone (not shown) of the information processing device 200. In addition, the proximity detecting unit 201 also may be provided in the vicinity of a microphone (not shown) or an input unit 102 of the information processing device 200.

According to specific configurations, the proximity detecting unit 203 comprises (but is not limited to) an ultrasonic distance sensor, an infrared (laser) distance sensor, and a capacitive distance sensor, etc., and is used for generating data associated with a distance between the display unit and a target-object. Here, it should be noted that as the structures and functions of the above-mentioned distance sensors are well known to the skilled in the art, the detailed description of their structures and functions is omitted here. In this case, the processing unit 104 is based on, in addition to the motion-related data, also on the detection result of the proximity detecting unit, to control enable/disable of the display unit 101 and/or the input unit 102.

Next, a detailed description will be given on how the processing unit 104 controls enable/disable of the display unit 101 and/or the input unit 102 based on the detection result of the proximity detecting unit and the motion-related data, with the case that the motion detecting unit 103 is an acceleration sensor as an example.

Here, it should be noted that, since the operation performed by the motion detecting unit 103 of the information processing unit 200 and the operation performed by the processing unit 104 based on the acceleration values detected by the motion detecting unit 103 are the same as what is performed by the corresponding units of the information processing device 100 shown in FIG. 1, repeated description thereof is omitted here.

For example, when a user starts to make a call or answer a call, the processing unit 104 activates the proximity detecting unit 201. In this period of time, the processing unit 104, in a manner as described with respect to FIG. 1, obtains a motion-magnitude based on the motion detecting unit 103.

In this period of time, if the processing unit 104 determines that the obtained motion-magnitude is greater than a predetermined motion-magnitude threshold, then the processing unit 104, based on the data obtained by the proximity detecting unit 201, which is associated with the distance between the display unit 101 and a target-object (e.g., ear or face), judges whether or not the distance between the display unit and the target-object is greater than a predetermined distance threshold. If the processing unit 104 judges that the distance is greater than the distance threshold, then the processing unit 104 enables the display unit 101 and/or the input unit 102. Here, it should be noted that, the distance threshold may be set based on experience or as needed, and may be (for example) 1 cm. Further, the distance threshold may be stored in a storage unit (not shown) of the information processing device 200.

Specifically, according to one embodiment of the present invention, in the case that the proximity detecting unit 201 is, for example, an ultrasonic distance sensor or an infrared distance sensor or the like, the processing unit 104 may obtain the distance between display unit 101 and an target-object (e.g., ear or face) from the proximity detecting unit 201, and compares the distance with a predetermined distance threshold. When the motion-magnitude of the information processing device 200 is greater than a predetermined motion-magnitude threshold, the processing unit 104, based on the output of the proximity detecting unit 201, judges whether or not the distance between the display unit 101 and the target-object is greater than the predetermined distance threshold. In this case, if the processing unit 104 judges that the distance is greater than the predetermined distance threshold, then the processing unit 104 enables the display unit 101 and/or the input unit 102. Otherwise, even if the motion-magnitude of the information processing device 200 is greater than the predetermined motion-magnitude threshold, but as the distance between the display unit 101 and the target-object is less than the predetermined distance threshold, the processing unit 104 still keeps the display unit 101 and/or the input unit 102 disabled. Although the control method performed by the information processing device 200 is described in the above order, the present invention is not limited to the above-described order.

For example, alternatively, the following configuration also may be carried out. The processing unit 104, based on the proximity detecting unit 201, judges whether or not the distance between the display unit 101 and a target-object is greater than a predetermined distance threshold. If the processing unit 104 determines that the distance is greater than the predetermined distance threshold, then the processing unit 104, based on the output of the motion detecting unit 103, judges whether or not the motion-magnitude of the information processing device 200 is greater than a predetermined motion-magnitude threshold. In this case, if the motion-magnitude of the information processing device 200 is greater than the predetermined motion-magnitude threshold, then the processing unit 104 enables the display unit 101 and/or the input unit 102. Otherwise, even if the distance between the display unit 101 and the target-object is greater than the predetermined distance threshold, but as the motion-magnitude of the information processing device 200 is less than the predetermined motion-magnitude threshold, the processing unit 104 still keeps the display unit 101 and/or the input unit 102 disabled.

Furthermore, according to another embodiment of the present invention, in the case that the proximity detecting unit 201 is a capacitive proximity-sensor, because this type of proximity detecting unit 201 generates an electrical signal when an object (e.g., a user's face or ear) enters its surrounding detection range (e.g., 1 cm), but it does not generate an electrical signal when an object leaves its detection range, the processing unit 104 thus also can, based on the output of the proximity detector unit 201 (i.e., an electric signal), judge whether or not the distance between the display unit 101 and a target-object is greater than a predetermined distance threshold, and similar to the above description, the processing unit 104 is based on, in addition to the motion-magnitude, also on the detection result of the proximity detecting unit (i.e., whether or not an object is close to the proximity detecting unit), to control enable/disable of the display unit 101 and/or the input unit 102.

In addition, according to another embodiment of the present invention, in the case that the processing unit 104 is based on the output of the motion detecting unit 105 (e.g., acceleration values in x, y, and z-axis) to judge the posture or the posture-change of the information processing device 200, it is similar to the above description that the processing unit 104 receives data associated with the distance between the display unit 101 and a target-object (e.g., a distance or a signal indicating whether or not a target-object is close to the proximity detecting unit) from the proximity detecting unit, and judges whether or not the distance between the display unit 101 and the target-object is greater than a predetermined distance threshold. At this point, if the distance is greater than the predetermined threshold distance, and the posture of the information processing device is substantially in a horizontal posture or the posture-change is greater than a predetermined threshold, then the processing unit 104 enables the display unit 101 and/or the input unit 102. Otherwise, the processing unit 104 keeps the display unit 101 and/or the input unit 102 disabled.

With the above configuration, the processing unit 104, based on both the output of the motion detecting unit 102 (e.g., the acceleration values) and the output of the proximity detecting unit 201 (e.g., distance or a signal indicating whether or not a target-object is close to the proximity detecting unit), controls enable/disable of the display unit 101 and/or the input unit 102. When only one of both the output of the motion detecting unit 102 and the output of the proximity detecting unit 201 satisfies a condition, the processing unit 104 still keeps the display unit 101 and/or the input unit 102 disabled. In this case, even if the information processing device 200 during a call has a motion with a relatively large magnitude (e.g., when jogging or the information processing device is picked up for answering a call, etc.) or it has a relatively large posture-change, the processing unit 104 is still based on the output of the proximity detecting unit 201 to judge whether or not the user puts the information processing device 200 near his ear. If the processing unit 104, based on the output of the proximity detecting unit 201, judges that the user puts the information processing device 200 near his ear then the processing unit 104 still keeps the display unit 101 and/or the input unit 102 disabled. By judging based on both the output of the motion detecting unit 102 and the output of the proximity detecting unit 201, it further reduces the probabilities of misjudgment of the processing unit 104 which causes the display unit 101 and/or the input unit 102 to be enabled, thereby further enhancing used experience, and further reducing power consumption.

In addition, in the prior art, there is a technical scheme which solely uses the proximity detecting unit to control the display unit and/or the input unit. However due to the proximity detecting unit has different responses to a variety of materials (e.g., it may not respond to or has insensitive response to hair near a user's ear), so even if the user puts the information processing device near his ear, there is still possibility that the processing unit, based on an erroneous detection result of the proximity detecting unit, makes a misjudgment that the user takes the information processing device away from his face or ear, so that the display unit and/or the input unit is(are) erroneously enabled, thereby causing misoperations and disadvantageous effects such as lighting of the display unit. However, according to the embodiment of the present invention, even if the processing unit 104, based on an erroneous output of the proximity detecting unit 201, judges that the display unit 101 is not close to a target-object (i.e., the distance between the two is greater than a predetermined distance threshold), but as there usually does not exist a motion with a relatively large magnitude or a relatively large posture-change during a call, so the processing unit 104 is also based on the output of the motion detecting unit 2103 to further judge whether or not the user takes the information processing device 200 away from his ear. If the processing unit 104, based on the output of the motion detecting unit 103, judges that the user does not take the information processing device 200 away from his ear (i.e., the motion detecting unit 103 does not detect a relatively large motion-magnitude or a relatively large posture-change), then the processing unit 104 still keeps the display unit 101 and/or the input unit 102 disabled. By judging based on both the output of the motion detecting unit 103 and the output of the proximity detecting unit 201, it makes improvement on the issue that—the processing unit 104 erroneously enables the display unit 101 and/or the input unit 102 based solely on an erroneous output of the proximity detecting unit 201, thereby further enhancing user experience, and it can further reduce power consumption.

Figure 3:
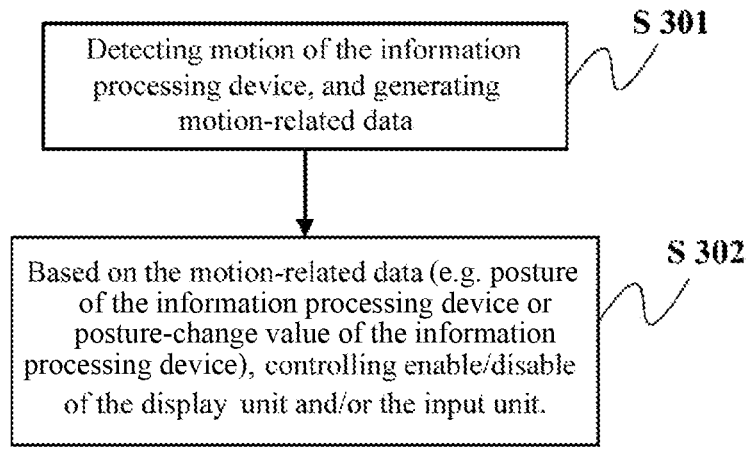
FIG. 3 is a flowchart illustrating a control method executed by the information processing device shown in FIG. 1.

Next, with reference to FIG. 3, a control method performed by the information processing device according to an embodiment of the present invention will be described. FIG. 3 is a flowchart illustrating a control method of the information processing device 100 according to an embodiment of the present invention.

For example, when users starts to make a call or answer a call, the information processing device 100 performs a control method as shown in FIG. 3.

As shown in FIG. 3, at step S301, the motion of the information processing device 100 is detected, the motion-related data is generated.

Specifically, for example, in the case that the motion detecting unit 103 is a 3-axis acceleration sensor, the motion detecting unit 103 detects the acceleration values of the information processing device 100 in three axes (e.g., x, y, and z-axis). In addition, in the case that the motion detecting unit 103 is a gyroscope, the motion detecting unit 103 detects an angular velocity and an angular acceleration of the information processing device 100.

At step S302, the display unit 101 and/or the input unit 102 is controlled to enable/disable, based on the motion-related data.

Specifically, when the motion-related data (e.g., acceleration values, angular velocity or angular acceleration value) of the information processing device 100 satisfies a predetermined condition, the processing unit 104 enables the display unit 101 and/or the input unit 102. Otherwise, the processing unit 104 keeps the display unit 101 and/or the input unit 102 disabled.

For example, in the case that the motion-magnitude of the information processing device 100 is adopted to judge that the information processing device 100 is taken away from a user's ear, the control method shown in FIG. 3 further comprises obtaining a motion-magnitude threshold. In addition, the step S302 further comprises: the motion-magnitude of the information processing device 100 is determined based on the acceleration values, and the motion-magnitude is compared with the obtained motion-magnitude threshold, and if the motion-magnitude is greater than the motion-magnitude threshold, then the display unit 101 and/or the input unit 102 is (are) enabled.

Specifically, the processing unit 104 may obtain the motion-magnitude from a storage unit of the information processing device 100. In addition, as described above, the processing unit 104 may utilize the expression (1) or the expression (2) or the like, based on the acceleration values of the information processing device 100, to determine its motion-magnitude, and compare the motion-magnitude with a motion-magnitude threshold. When the motion-magnitude is greater than the motion-magnitude threshold, the processing unit 104 enables the display unit 101 and/or the input unit 102. Otherwise, the processing unit 104 keeps the display unit 101 and/or the input unit 102 disabled.

In addition, according to another embodiment of the present invention, in the case that the posture of the information processing device 100 is adopted to judge that a user takes the information processing device 100 away from his ear, the step S302 of FIG. 3 further comprises: the posture of the information processing device 100 at the end of a motion is determined based on the acceleration values, and when the posture of the information processing device 100 satisfies a predetermined condition, the display unit 101 and/or the input unit 102 is(are) enabled.

Specifically, as previously described with respect to the information processing device 100 of FIG. 1, the processing unit 104 can, by judging whether or not the posture of the display unit 101 of the information processing device 100 tends to horizontal, or by calculating the posture-changes (angular difference) of the display unit 101 before and after an action, determine whether or not a user takes the information processing device 100 away from his ear. After the action is ended, if the posture of the display unit 101 tends to horizontal, or in the case that the posture-change (angular difference) of the display unit 101 and after the action is greater than a predetermined threshold (set based on experience), the processing unit 104 enables the display unit 101 and/or the input unit 102. Otherwise, the processing unit 104 keeps the display unit 101 and/or the input unit 102 disabled.

In addition, for example, in the case that the processing unit 104 determines, through the posture-change of the information processing device 100, whether or not to enable the display unit 101 and/or the input unit 102, the step S301 of FIG. 3 may be implemented by detecting the posture-change value of the information processing device 100. In this case, the step S302 further comprises: when the posture-change value of the information processing device 100 satisfies a predetermined condition, the display unit 101 and/or the input unit 102 is(are) enabled.

Specifically, in the case that the motion detecting unit 103 is a gyroscope, the motion detecting unit 103 detects an angular velocity and an angular acceleration which indicates a state-change of the information processing device 100. When the angular velocity and angular acceleration, which indicates the extent of the posture-change of the information processing device 100, exceeds a predetermined threshold, it usually indicates that the information processing device 100 has a relatively large motion-magnitude, and the motion is usually the action that the user takes the information processing device 100 away from his ear. Therefore, the processing unit 104 compares the angular velocity and the angular acceleration detected by the motion detecting unit 103 with predetermined angular velocity and angular acceleration threshold, and when the angular velocity and angular acceleration are greater than the predetermined angular velocity and angular acceleration thresholds, the processing unit 104 enables the display unit 101 and/or the input unit 102. Otherwise, the processing unit 104 keeps the display unit 101 and/or the input unit 102 disabled.

Figure 4:
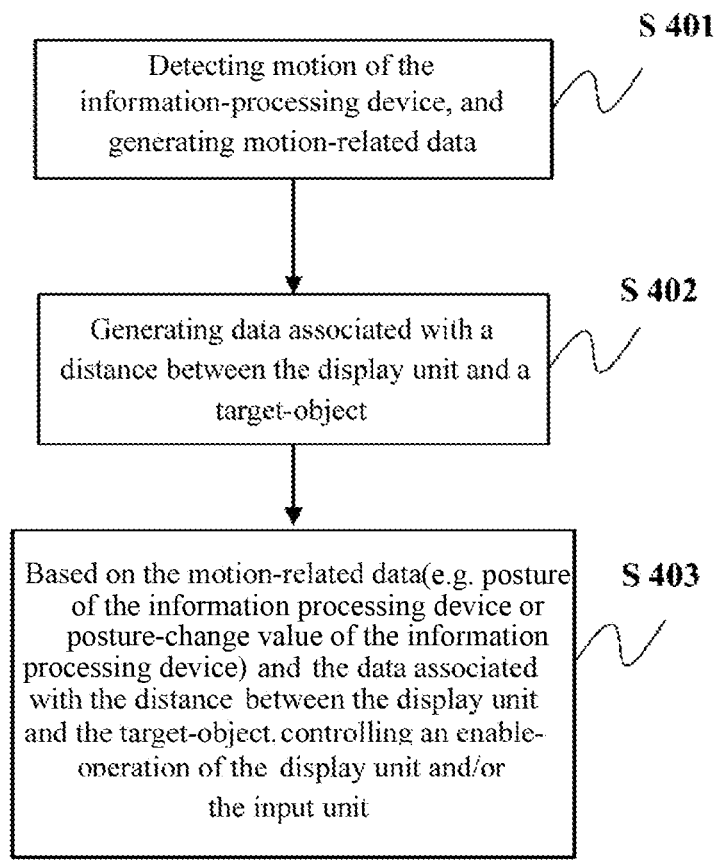
FIG. 4 is a flowchart illustrating a control method executed by the information processing device shown in FIG. 2.

Next, with reference to FIG. 4, a control method performed by an information processing device according to another embodiment of the present invention will be described. FIG. 4 is a flowchart illustrating a control method performed by an information processing device 200 according to another embodiment of the present invention.

For example, when a user starts to make a call or answer a call, the information processing device 200 performs the control method shown in FIG. 4.

As shown in FIG. 4, at step S401 the motion of the information processing device 200 is detected, and the motion-related data is generated.

At step S402, data associated with the distance between the display unit 101 and a target-object is generated.

At step S403, an enable-operation of the display unit 101 and/or the input unit 102 is controlled, based on the motion-related data and the data associated with the distance between the display unit 101 and the target-object.

Specifically, the motion detecting unit 103 detects the motion of the information processing device 200, and generates the motion-related data. The proximity detecting unit 201 generates the data associated with the distance between the display unit 101 and the target-object. Then, the processing unit 104, based on the motion-related data and the data associated with the distance between the display unit 101 and the target-object, controls an enable-operation of the display unit 101 and/or the input unit 102.

For example, in the case that the processing unit 104 is based on the acceleration values to determine the motion-magnitude of the information processing device 200, it is similar to the foregoing description that the processing unit 104, in a manner as described with respect to FIG. 1, determines the motion-magnitude based on the motion-related data generated by the motion detecting unit 103.

Meanwhile, the processing unit 104 obtains a distance threshold from (for example) a storage unit, and based on the data associated with a distance between the display unit 101 and a target-object (e.g., ear or face) obtained by the proximity detecting unit 201, judges whether or not the distance between the display unit 101 and the target-object is greater than the predetermined distance threshold. If the processing unit 104 judges that the distance is greater than the distance threshold and the motion-magnitude is greater than a predetermined motion-magnitude threshold, then the processing unit 104 enables the display unit 101 and/or the input unit 102. Otherwise, the processing unit 104 keeps the display unit 101 and/or the input unit 102 disabled.

In addition, in the case that the processing unit 104 is based on the output of the motion detecting unit 103 to judge the posture or the posture-change of the information processing device 200, it is similar to the above description that the processing unit 104 obtains a distance threshold from, for example, a storage unit, and based on the data associated with a distance between the display unit 101 and a target-object obtained from the proximity detecting unit 201, judges whether or not the distance between the display unit 101 and the target-object is greater than a predetermined distance threshold. At this point, if the distance is greater than the predetermined distance threshold, and the processing unit 104 determines that the posture of the information processing device is substantially in a horizontal posture or the posture-change of the information processing device is greater than a predetermined threshold, then the processing unit 104 enables the display unit 101 and/or the input unit 102. Otherwise, the processing unit 104 keeps the display unit 101 and/or the input unit 102 disabled.

Although the above describes the control method according to the embodiment of the present invention, however, the control method according to the embodiment of the present invention is not limited to the order described in the above. Obviously, some of the steps in the control method according to the embodiment of the present invention may be executed in parallel or in other orders (e.g., by exchanging some of the steps in the order).

The above has described the operations performed by the information processing device 100 (200) with the situation that a user makes a call or answers a call as an example. However, the present invention is not limited thereto, in the situations such as answering a voice-message or using the information processing device 100 (200) for a short-distance call (a walkie-talkie function) or the like, the user also needs to put the information processing device 100 (200) near his ear and does not need to watch the screen. For this purpose, the processing unit 104 may, for example, monitor the above-described situations by monitoring a specific program (e.g., a voicemail interface) or monitoring the work of a specific-functional device (e.g., an earphone or microphone of the information processing device), and upon the detection of the above situations, the processing unit 104 may activate the motion detecting unit 103 (or, the motion detecting, unit 103 and the proximity detecting unit 201), and based on the output of the motion detecting unit 103 or the outputs of the motion detecting unit 103 and of the proximity detecting unit 201), enable/disable the display unit 101 and/or the input unit 102, thereby preventing misoperations performed by the user to the information processing device 100 (200) in the above-described situations.

In addition, it is also possible to run the motion detecting unit 103 (or, the motion detecting unit 103 and the proximity detecting unit 201) all the time after the information processing device 100 (200) is powered on, and the processing unit 104 is based on the output of the motion detecting unit 103 (or, the outputs of the motion detecting unit 103 and of the proximity detecting unit 201) to enable/disable the display unit 101 and/or the input unit 102. In this case, when the information processing device 100 (200) is in a stand-by mode, by shaking or swinging the information processing device 100 (200), a user can enable the display unit 101 and/or the input unit 102 of the information processing device 100 (200). In this case, a user can enable the display unit 101 and/or the input unit 102, without pressing a certain key (e.g., unlock) or—in the case that the input unit 102 is a touch-sensor—touching a particular position or pattern, which makes the operations easier.

In addition, the processing unit 104 can also monitor certain conditions, such as a connection of the information processing device 100 (200) with a specific peripheral device (e.g., a headset, a Bluetooth headset, etc.), or an enable of particular sound-output component (e.g., a speaker). Here, it should be no that, the specific sound-output component (e.g., a speaker) is a component, of which the volume is greater than that of an earphone, and the sound from which can be clearly heard by a user without putting the information processing device near his ear. In these cases, since the user usually does not need to put the information processing device 100 (200) near his ear, the processing unit 104 may also, not based on the output of the motion detecting unit 103 (or, the outputs of the motion detecting unit 103 and of the proximity detecting unit 201), enable/disable the display unit 101 and/or the input unit 102, thereby further reducing the probabilities that the information processing device 100 (200) generates misoperations.

Although the above has described a plurality of embodiments of the present invention, it should be noted that the embodiments of the present invention may be implemented by using entirely hardware, or using entirely software, or by way of combining hardware and software. For example, in some embodiments, it is possible to implement the embodiment of the present invention, by way of installing a software in a computer or a mobile terminal system, which comprises (but is not limited to) a firmware, a built-in software, a micro-code, etc. In addition, the present invention may be adopted in the form of a computer program product that can be executed by a computer or any of command execution stems (e.g., cell phones, PDAs, etc.) to perform the processing method according to the embodiments of the present invention, and the computer program product is stored in a machine-readable medium. Examples of the machine-readable medium include a semiconductor or a solid state memory, a magnetic tape, a removable computer diskette, a random access memory (RAM), a read-only memory (ROM), a hard disk, and a CD-ROM, etc.

As described above, the above has specifically described various embodiments of the present invention, but the present invention is not limited thereto, it should be understood by the skilled in the art that, depending on design requirements or other factors, various modifications, combinations, sub-combinations, or replacements can be carried out in so far as they are within the scope of the appended claims and their equivalents.

What is claimed is:
1. An information processing device, comprising:
    a display unit configured to display images;
    an input unit configured to receive inputs from a user;
    a motion detecting unit, configured to detect motion of the information processing device, and to generate motion-related data; and
    a processing unit, which is connected with the display unit, the input unit and the motion detecting unit, and, in a calling state, is configured to, in a calling state, receive the motion-related data from the motion detecting unit, and based on the motion-related data, control the state of the input unit to change from an enabling state to a disable state or from the disable state to the enabling state to prevent misoperation by the user, and when the motion-related data indicates that information processing device is moving, the processing unit controls the state of the display unit to change from the disable state to the enabling state.
2. The information processing device according to claim 1, wherein,
    the motion detecting unit is an acceleration sensor, and is configured to detect an acceleration value of the information processing device, and
    when the acceleration value of the information processing device satisfies a predetermined condition, the processing unit enables the input unit in the calling state.
3. The information processing device according to claim 2, further comprising:
    a storage unit configured to store a first threshold;
    wherein the processing unit, based on the acceleration value, determines a motion-magnitude, and compares the motion-magnitude with the first threshold, and
    if the motion-magnitude is greater than the first threshold, then the processing unit enables the input unit in the calling state.
4. The information processing device according to claim 3, further comprising:
    a proximity detecting unit, provided in the vicinity of the display unit, and configured to generate data associated with a distance between the display unit and a target-object;
    a storage unit configured to store a second threshold,
    wherein the processing unit, based on a detection result of the proximity detecting unit, judges whether or not the distance between the display unit and the target-object is greater than the second threshold, and
    if the distance is greater than the second threshold, and the motion-magnitude is greater than the first threshold, then the processing unit enables the input unit in the calling state.

5. The information processing device according to claim 2, wherein
the processing unit, based on the acceleration value, determines a posture of the information processing device at the end of the motion; and
when the posture of the information processing device satisfies a predetermined condition, the processing unit enables the input unit in the calling state.

6. The information processing device according to claim 5, further comprising:
a proximity detecting unit, provided in the vicinity of the display unit, and configured to generate data associated with a distance between the display unit and a target-object; and
a storage unit configured to store a second threshold,
wherein the processing unit, based on a detection result of the proximity detecting unit, judges whether or not the distance between the display unit and the target-object is greater than the second threshold, and
if the distance is greater than the second threshold, and the posture of the information processing device satisfies a predetermined condition, then the processing unit enables the input unit in the calling state.

7. The information processing device according to claim 1, wherein
the motion detecting unit is a gyroscope, and is configured to detect a posture-change value of the information processing device; and
when the posture-change value of the information processing device satisfies a predetermined condition, the processing unit enables the input unit in the calling state.

8. The information processing device according to claim 1, further comprising:
a proximity detecting unit, provided in the vicinity of the display unit, and configured to generate data associated with a distance between the display unit and a target-object;
wherein, the processing unit, based on the motion-related data and a detection result of the proximity detecting unit, controls an enable-operation the input unit in the calling state.

9. A control method applied in an information processing device, wherein the information processing device comprises a display unit and an input unit, the control method comprising:
detecting motion of the information processing device, and generating motion-related data; and
in a calling state, based on the motion-related data, controlling a state of the display unit to control a state of the input unit to change from an enabling state to a disable state or from the disable state to the enabling state to prevent misoperation by the user, and
when the motion-related data indicates the information processing device is moving, the state of the display unit is controlled to change from the disable state to the enabling state.

10. The control method according to claim 9, wherein
the step of detecting motion of the information processing device comprises: detecting an acceleration value of the information processing device; and
the step of controlling enable/disable of the input unit further comprises: when the acceleration value of the information processing device satisfies a predetermined condition, enabling the display unit and/or the input unit.

11. The control method according to claim 10, further comprising:
obtaining a first threshold;
wherein the step of enabling the input unit comprises:
based on the acceleration value, determining a motion-magnitude, and comparing the motion-magnitude with the first threshold, and
if the motion-magnitude is greater than the first threshold, then enabling the input unit.

12. The control method according to claim 11, further comprising:
obtaining data associated with a distance between the display unit and a target-object; and
obtaining a second threshold,
wherein the step of enabling the input unit further comprises:
based on the data associated with the distance between the display unit and the target-object, judging whether or not the distance between the display unit and the target-object is greater than the second threshold, and
if the distance is greater than the second threshold, and the motion-magnitude is greater than the first threshold, then enabling the input unit.

13. The control method according to claim 10, wherein the step of enabling the input unit comprises:
based on the acceleration value, determining a posture of the information processing device at the end of the motion; and
when the posture of the information processing device satisfies a predetermined condition, enabling the input unit.

14. The control method according to claim 13, further comprising:
obtaining data associated with a distance between the display unit and a target-object; and
obtaining a second threshold,
wherein the step of enabling the input unit further comprises:
based on a detection result of the proximity detecting unit, judging whether or not the distance between the display unit and the target-object is greater than the second threshold, and
if the distance is greater than the second threshold, and the posture of the information processing device satisfies a predetermined condition, then enabling the input unit.

15. The control method according to claim 10, wherein the step of detecting motion of the information processing device comprises: detecting a posture-change value of the information processing device; and
the step of controlling enable/disable of the input unit comprises: when the posture-change value of the information processing device satisfies a predetermined condition, the processing unit enables the display unit and/or the input unit.

16. The control method according to claim 9, further comprise:
generating data associated with a distance between the display unit and a target-object;
wherein the step of controlling enable/disable of the input unit further comprises: based on the motion-related data and the data associated with the distance between the display unit and the target-object, controlling an enable-operation of the input unit.

* * * * *